United States Patent [19]

Chigusa et al.

[11] Patent Number: 5,567,314
[45] Date of Patent: Oct. 22, 1996

[54] APPARATUS FOR BIOLOGICALLY TREATING LIPID-CONTAINING WASTE WATER

[75] Inventors: Kaoru Chigusa; Yasuhiro Nakai, both of Tokyo, Japan

[73] Assignee: Nishihara Environmental Sanatation Res. Corp., Tokyo, Japan

[21] Appl. No.: 316,023

[22] Filed: Sep. 30, 1994

[30] Foreign Application Priority Data

Oct. 1, 1993 [JP] Japan .................................. 5-269898

[51] Int. Cl.$^6$ .................. C02F 3/06; C02F 3/34
[52] U.S. Cl. .................. 210/150; 210/606; 210/615; 435/299.1; 435/921
[58] Field of Search .................. 210/150, 151, 210/602, 606, 615, 632; 435/299.1, 921

[56] References Cited

U.S. PATENT DOCUMENTS

| | | | |
|---|---|---|---|
| 3,468,795 | 9/1969 | Bye-Jorgensen et al. | 210/150 |
| 5,019,268 | 5/1991 | Rogalla | 210/151 |
| 5,085,766 | 2/1992 | Born | 210/150 |
| 5,122,287 | 6/1992 | Hsiung | 210/274 |
| 5,298,164 | 3/1994 | Hapach et al. | 210/615 |
| 5,397,474 | 3/1995 | Henry | 210/150 |

FOREIGN PATENT DOCUMENTS

| | | | |
|---|---|---|---|
| 3275195 | 12/1991 | Japan | 210/606 |
| 3278897 | 12/1991 | Japan | 210/606 |

*Primary Examiner*—Peter A. Hruskoci
*Assistant Examiner*—Theodore M. Green
*Attorney, Agent, or Firm*—Ronald R. Snider

[57] ABSTRACT

An apparatus for biologically treating lipid-containing waste water comprising a waste water introducer, a biological treatment constituted by a carrier holding a fixed lipid-assimilating, and a discharge for discharging the treated waste water. The carrier has a shape of string, lace, mat, sheet, fiber, sponge or film which facilitates the lipid-assimilating yeast to cling thereto. The apparatus may also be provided with backwashing for the biological treatment carrier, and an aerator for aerating the waste water. It is possible to directly treat lipid-containing waste water without producing any harmful matter and to efficiently reduce the concentration of the lipid (n-hexane extract) to not more than 30 mg/l. Furthermore, the maintenance of the apparatus is easy.

9 Claims, 1 Drawing Sheet

APPARATUS FOR BIOLOGICALLY TREATING LIPID-CONTAINING WASTE WATER

FIELD OF THE INVENTION

The present invention relates to an apparatus for biologically treating lipid-containing waste water and, more particularly, to a waste water treating apparatus using a lipid-assimilating yeast which has mycelium or pseudomycelium.

BACKGROUND OF THE INVENTION

Recently waste water treatment has increasingly become an important problem. Especially, waste water containing a large amount of lipid such as waste water from the kitchen of a hotel or a restaurant cannot be flushed down the drain as it is, and it is the rule that the lipid concentration is to be reduced to not more than 30 mg/l as the concentration of the n-hexane extract before flushing the waste water down the drain.

Such lipid-containing waste water is conventionally treated by removing the oil content by a physiochemical pretreatment using a grease trap, a fat splitting tank, a floatation equipment or the like, or a biological treatment before the waste water is flushed down the drain.

Such a physiochemical pretreatment, however, suffers from problems that it requires a facility having a large area and that the cost of building the treatment facility and the cost of disposing the waste oil are very high. In addition, it is necessary that the separated lipid is finally disposed by incineration, dumping, reclamation or the like. Incineration offers a problem of air pollution or the like, and dumping and reclamation are faced with a problem of dump shortage. That is, the disposal of the separated lipid has been difficult.

A method of treating waste water cleanly without the need for separating lipid is therefore in demand.

Application of a method purifying lipid-containing waste water with a microorganism is expected as a method of directly treating the lipid cleanly without producing an air-polluting matter or other harmful matters.

As a matter of fact, however, the activated sludge process cannot be said satisfactory, because it cannot assimilate the lipid and it requires a new facility. Although some strains of yeasts having lipid-assimilating property grow into a globular yeast, they float in a treatment tank and easily flow out. On the other hand, if a conventional method of fixing a yeast with sodium argininate or carrageenan is adopted in order to prevent the yeast from flowing out, the treating capacity is greatly reduced.

SUMMARY OF THE INVENTION

Accordingly, it is an object of the present invention to eliminate the above-described problems in the related art and to provide an apparatus for biologically treating lipid-containing waste water which has a sufficient lipid treating capacity and which is easy to maintain.

To achieve this aim, in a first aspect of the present invention, there is provided an apparatus for biologically treating lipid-containing waste water comprising: an introducing means for introducing lipid-containing waste water; a biological treatment means constituted by a carrier holding a fixed lipid-assimilating yeast which has mycelium or pseudomycelium (hereinafter referred to as only "lipid-assimilating yeast"); and a discharging means for discharging the waste water treated by the biological treatment means.

An apparatus for biologically treating lipid-containing waste water provided in a second aspect of the present invention is characterized in that the carrier used as the biological treatment means has a shape of string, lace, mat, sheet, fiber, sponge or film which facilitates the lipid-assimilating yeast to cling thereto.

An apparatus for biologically treating lipid-containing waste water provided in a third aspect of the present invention further comprises a washing means for backwashing the biological treatment means.

An apparatus for biologically treating lipid-containing waste water provided in a fourth aspect of the present invention further comprises an aerating means for aerating the lipid-containing waste water.

An apparatus for biologically treating lipid-containing waste water provided in a fifth aspect of the present invention is characterized in that:

- the aerating means is disposed in a lower part of an introducing portion which is provided adjacent to a treatment tank;
- the introducing means is disposed above the aerating means in the introducing portion;
- the biological treatment means is disposed in the treatment tank;
- the washing means is disposed below the biological treatment means;
- the discharging means is disposed above the treatment tank; and
- the lower part of the introducing portion is connected to the lower part of the treatment tank, while the upper part of the introducing portion is connected to the upper part of the treatment tank so as to enable the treated waste water to flow from the introducing portion to the upper part of the treatment tank.

An apparatus for biologically treating lipid-containing waste water provided in a sixth aspect of the present invention is characterized in that the lipid-assimilating yeast is at least one selected from the group consisting of Candida schatavii N4 strain (FERM P-12768), Candida fluviatilis N6 strain (FERM P-12770), Candida visuwanathii N8 strain (FERM 9-12772), Candida pseudolambica N9 strain (FERM P-12773) and Candida hellenica N10 strain (FERM P-12774).

An apparatus for biologically treating lipid-containing waste water provided in a seventh aspect of the present invention is characterized in that the lipid-containing waste water is treated under the conditions that the volume load is 0.2 to 5.0 kg n-hexane extract/$m^3$·day, and the yeast load of 0.05 to 5.0 kg of n-hexane extract/kg yeast·day.

An apparatus for biologically treating lipid-containing waste water according to the present invention which is provided with the above-described means has the following advantages.

The lipid-assimilating yeast used as the biological treatment means has a high production capacity of lipase, which hydrolyzes lipid and an excellent capacity of assimilating the fatty acid produced by the hydrolysis of lipid. Therefore, if the lipid-assimilating yeast is fixed on a carrier, it is scarcely influenced by a change in the amount of water or a change in the load, which enables a stable biological treatment. Since the yeast grows from hypha like mold, it is easy to fix the yeast by clinging to the carrier having a shape of string, lace, mat, sheet, fiber, sponge or film which facilitates the yeast to cling thereto. As a result, even if there is a large change in the amount of water, the yeast which is necessary for biological treatment does not easily flow out.

While the lipid-containing waste water introduced into the treatment tank passes through the biological treatment means constituted by a carrier holding a fixed lipid-assimilating yeast, the lipid of the waste water is assimilated by the lipid-assimilating yeast. The waste water treated by the biological treatment means is discharged out of the treatment tank by the discharging means.

If the biological treatment of waste water is continuously conducted by the waste water treating apparatus of the present invention, the lipid-assimilating yeast sometimes grows to an excess and to an anoxic state, which may lead to a clogging of the carrier holding the fixed yeast or hinder the discharge of waste water or the diffusion of air. As a countermeasure, a washing means for backwashing the biological treatment means is preferably provided. If the biological treatment means is periodically or irregularly backwashed by the washing means, it is possible to peel the excessively grown yeast from the carrier and discharge it together with the treated waste water, thereby easily maintaining an appropriate yeast concentration for biological treatment.

In the apparatus for biologically treating lipid-containing waste water of the present invention if an aerating means for aerating the lipid-containing waste water is provided and the lipid-containing waste water is mixed with an adequate amount of air, the assimilation reaction of the biological treatment means efficiently progresses.

In order to treat waste water by the apparatus for biologically treating lipid-containing waste water of the present invention, treatment is preferably conducted under the conditions that the volume load is 0.2 to 5.0 kg n-hexane extract/m$^3$·day, and the yeast load of 0.05 to 5.0 kg of n-hexane extract/kg yeast·day.

According to the apparatus for biologically treating lipid-containing waste water of the present invention, it is possible to reduce the lipid concentration to not more than 30 mg/l as the concentration of the n-hexane extract.

EXAMPLES

Figure 1:
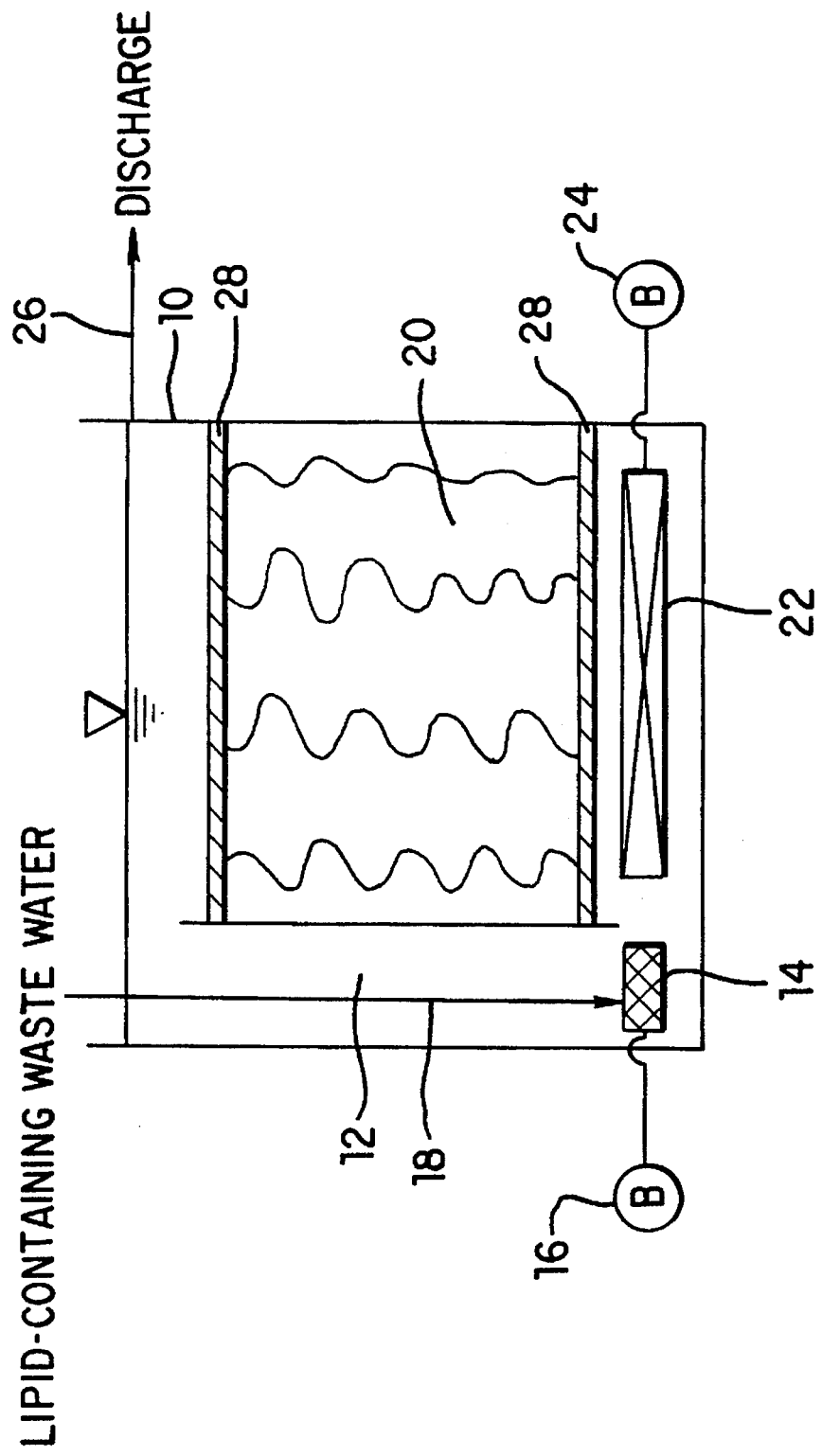
FIG. 1 shows an embodiment of an apparatus for biologically treating lipid-containing waste water according to the present invention.

A preferred embodiment of the present invention will be explained hereinunder, taken in conjunction with the accompanying drawing. The drawing only shows a fundamental structure of an emobidiment of the waste water treating apparatus of the present invention, and the shape may be different or another attachment may be included so long as the technical principle is the same.

EXAMPLE 1 (FIG. 1)

FIG. 1 shows an embodiment of an apparatus for biologically treating lipid-containing waste water according to the present invention.

An introducing portion 12 is provided so as to introduce lipid-containing waste water mixed with air to a treatment tank 10. The lower part of the introducing portion 12 is connected to the lower part of the treatment tank 10, while the upper part of the introducing portion 12 is connected to the upper part of the treatment tank 10 so as to enable the treated waste water to flow from the introducing portion to the upper part of the treatment tank 12. Before the lipid-containing waste water passes the biological treatment means, it is mixed with air in the introducing portion 12. This is in order to efficiently progress a reaction by the biological treatment means. In order to mix the waste water with air before introducing the waste water to the treatment tank 10, an aerating air jet pipe 14 is provided in the power part of the introducing portion 12 as an aerating means. The aerating air jet pipe 14 is provided in the lower part of the introducing portion 12 as an aerating means. The aerating air jet pipe 14 is connected to an aerating blower 16. As a means for introducing the lipid-containing waste water, a waste water introducing pipe 18 is provided above the aerating air jet pipe 14.

The treatment tank 10 is provided therein with a reaction vessel 20, which is the biological treatment means, and a washing air jet pipe 22, which is a washing means for backwashing the biological treatment means. A waste water discharging portion 26 for discharging the waste water treated by the biological treatment means out of the system is disposed in the upper part of the treatment tank 10. The washing air jet pipe 22 is connected to a washing blower 24.

The reaction vessel 20 as the biological treatment means is packed with carriers holding fixed lipid-assimilating yeast.

The lipid-assimilating yeast used in the present invention is not specified so long as it fully displays the effect of the present invention, but the preferred lipid-assimilating yeasts are, for example, Candida schatavii N4 strain (FERM P-12768), Candida fluviatilis N6 strain (FERM P-12770), Candida visuwanathii N8 straing (FERM 9-12772), Candida pseudolambica N9 strain (FERM P12773) and Candida hellenica N10 strain (FERM P-12774).

As the carrier for fixing the lipid-assimilating yeast, a material having a fat and oil adsorbing nature is preferable. Examples of such a material are an inorganic matter such as active alumina, a synthetic resin such as polyester and nylon, and cellulose sponge. The carrier may be powdery or globular, but the preferred shape of the carrier is string, lace, mat, sheet, fiber, sponge or film which facilitates the lipid-assimilating yeast to cling thereto. Examples of preferred lipid-assimilating yeasts are shown in Table 1. In order to prevent the carriers from clinging to each other or overlapping, stays such as stays 28 or a grille is provided in the treatment tank 10, thereby enabling efficient contact between the lipid-containing waste water and the carrier, and accelerating the biological treatment.

TABLE 1

| Carrier | Material · Shape |
| --- | --- |
| Oil film remover (produced by AG) | Rayon 30%, Polyester 60% Sheet |
| Handy dirt rubber (produced by Aisen Kogyo) | Rayon 100% Film |
| Sponge rubber (produced by Tokyo Bo' on | Expanded sheet of Nothorex rubber Sheet |
| Wet suit material (produced by Bridegestone) | Expanded rubber + nylon 100% Sheet |
| Cellulose sponge (produced by Toyko Rika Kakai) | Expanded vegetable cellulose Cubicle L 5 mm |
| Saran lock (produced by Kyokusui Planning) | Animal, vegetable and synthetic fibers Mat |
| Bioloop (produced by Konishi) | Vinylidene chloride fiber String |
| Ring lace | Vinylidene chloride fiber |

TABLE 1-continued

| Carrier | Material · Shape |
|---|---|
| (produced by Nihon Sangyo Kikai) | String |
| Biolace (produced by Toyo Tell-me Co., Ltd.) | Vinylidene chloride fiber Lace |

The washing means used in the present invention is not specified so long as an effect of backwashing the biological treatment means is produced. In this embodiment, the washing air jet pipe 22 is used.

In the apparatus of this embodiment, the lipid-containing waste water is first introduced from the waste water introducing pipe 18 to the introducing portion 12, aerated by the air jetted from the aerating air jet pipe 14, and then introduced to the treatment tank 10. In this way, the introducing portion is provided so as to mix the waste water with an adequate amount of air, so that efficient progress of the reaction by the biological treatment means at the next stage is enabled. In order to sufficiently aerate the waste water, it is preferable that the aerating air jet pipe 14 is disposed in the lower part of the introducing portion 12 and that the waste water introducing pipe 18 is disposed above the aerating air jet pipe 14 in proximity thereto. By disposing the waste water introducing pipe 18 in the lower part of the introducing portion 12, it is possible to prevent the waste water from short cutting overflowing.

The aerated waste water flows from the upper part of the introducing portion 12 into the treatment tank 10 and passes the reaction vessel 20 which is constituted by the carrier holding fixed lipid-assimilating yeast. The lipid in the lipid-containing waste water is assimilated by the lipid-assimilating yeast which is fixed on the carrier in the reaction vessel 20. The waste water treated by the reaction vessel 20 flows from the lower part of the treatment tank 10 to the lower part of the introducing portion 12 on the circular stream caused by the air jetted from the aerating air jet pipe 14, and further circulates from the upper part of the introducing portion 12 to the treatment tank 10. The treated waste water is discharged out of the system through the waste water discharging portion 26. The discharged waste water is flushed down the drain as it is, or the remaining organic matter is further decomposed by a new biological treatment before the waste water is flushed down the drain.

In this way, by circulating the treated waste water which has passed the reaction vessel 20, it is possible to reduce the lipid concentration to a very low concentration. The circulation is forced by the air jetted from the aerating air jet pipe 14.

If the biological treatment of waste water is continuously conducted by the apparatus of the present invention, the lipid-assimilating yeast sometimes grows to an excess, which may lead to a reduction in the treatment efficiency or a clogging of the carrier holding the fixed yeast.

In this case, if air is jetted from the washing air jet pipe 22, the air passes from the lower part of the reaction vessel 20 to the upper part thereof, and the yeast which has grown to an excess is backwashed. The yeast which has grown to an excess is peeled off the carrier, and the excess yeast peeled off flows together with the treated water and is fairly discharged from the waste water discharging portion 26. Simultaneously, the problem of a clogging of the carrier is solved. In this way, since the apparatus of the present invention is provided with the washing means, by periodically or irregularly backwashing the biological treatment means, it is easy to maintain an appropriate yeast concentration for biological treatment and stable and efficient operation of the apparatus is enabled.

EXAMPLE 1

The operating conditions and the results of treatment of the waste water treating apparatus shown in FIG. 1 which was applied to the treatment of waste water from a restaurant are shown in Table 2.

TABLE 2

| <Operating Conditions> | |
|---|---|
| Yeast: | *Candida schatavii* N4 strain<br>*Candida psuedolambica* N9 strain |
| Fixing carrier: | Bioloop |
| Volume of reaction vessel: | 100 l |
| Volume load: | 0.2 to 1.0 kg n-hexane extract/$m^3$ · day |
| Yeast load: | 0.2 to 0.5 kg of n-hexane extract/kg yeast · day. |
| Backwash by washing means: | Once every four hours |

| <Results of treatment> | |
|---|---|
| | Concentration of n-hexane extract (lipid) |
| Introduced waste water (Lipid-containing waste water) | 300 to 700 mg/l |
| Treated waste water | Not more than 5 mg/l |

EXAMPLE 2

The waste water treating apparatus in Example 1 was applied to the treatment of the waste water from the kitchen of a hotel. The operating conditions and the results of treatment are shown in Table 3.

TABLE 3

| <Operating conditions> | |
|---|---|
| Yeast: | *Candida fluviatilis* N6 strain<br>*Candida visuwanathii* N8 strain<br>*Candida hellenica* N10 strain |
| Fixing carrier: | Saran lock |
| Volume of reaction vessel: | 100 l |
| Volume load: | 0.6 to 1.5 kg n-hexane extract/$m^3$ · day |
| Yeast load: | 1.2 to 1.5 kg n-hexane extract/kg yeast · day. |
| Backwash by aerating device: | Once every four hours |

| <Results of treatment> | |
|---|---|
| | Concentration of n-hexane extract (lipid) |
| Introduced waste water (Lipid-containing waste water) | 120 to 1350 mg/l |
| Treated waste water | Not more than 10 mg/l |

According to the apparatus for biologically treating lipid-containing waste water of the present invention, it is possible to directly treat lipid-containing waste water without the need for physically separating the lipid therefrom. In addition, no harmful matter is produced and it is possible to efficiently reduce the concentration of the lipid (n-hexane extract) to not more than 30 mg/l. Furthermore, the maintenance of the apparatus is easy.

While there has been described what is at present considered to be a preferred embodiment of the invention, it will be understood that various modifications may be made thereto, and it is intended that the appended claims cover all such modifications as fall within the true spirit and scope of the invention.

What is claimed:

1. An apparatus for biologically treating lipid-containing waste water comprising:

a tank having a bottom and a top;

an introducing means for introducing lipid-containing waste water into said tank;

an aerating means for aerating said lipid-containing waste water;

an aerobic biological treatment means in said tank constituted by a carrier holding a fixed lipid assimilating yeast wherein said carrier is submerged in a mixture of air and waste water;

a discharging means for discharging the waste water from said tank treated by said biological treatment means wherein said lipid-assimilating yeast is at least one selected from the group consisting of Candida schatavii N4 strain (FERM P-12768), Candida fluviatilis N6 strain (FERM P-12770), Candida visuwanathii N8 strain (FERM 9-12772), Candida pseudolambica N9 strain (FERM P-12773) and Candida pseudolambica N9 strain (FERM P-12774).

2. An apparatus for biologically treating lipid-containing waste water provided according to claim 1, wherein said carrier used as said biological treatment means has a shope of one selected from the group consisting of string lace mat sheet fiber sponge or filn which facilitate said lipid-assimilating yeast to cling thereto.

3. An apparatus for biologically treating lipid-containing waste water according to claim 1, further comprising a washing means for backwashing said biological treatment means.

4. An apparatus for biologically treating lipid-containing waste water according to claim 3, wherein:

said tank is divided into an introducing portion and a treatment portion;

said aerating means is disposed in a lower part of said introducing portion;

an introducing means is disposed at the bottom of said introducing portion and above said aerating means;

said biological treatment means is disposed in said treatment portion;

said washing means is disposed below said biological treatment means; and the lower part of said introducing portion is connected to the lower part of said treatment portion, while the upper part of said introducing portion is connected to the upper part of said treatment portion so as to enable said waste water treated by said biological treatment means to flow from the lower part of said introducing portion to the upper part of said treatment portion.

5. An apparatus for biologically treating lipid-containing waste water according to claim 1, wherein said lipid-containing waste water is treated under the conditions that the volume load is 0.2 to 5.0 kg n-hexane extract/$m^3$·day, and the yeast load of 0.05 to 5.0 kg of n-hexane extract/kg yeast-day.

6. An apparatus for biologically treating lipid-containing waste water according to claim 1, wherein wash material is discharged through said discharging means.

7. An apparatus for biologically treating lipid-containing waste water according to claim 1, wherein said carrier is fixed in position in said tank.

8. An apparatus for biologically treating lipid-containing waste water comprising:

a tank having a bottom and a top;

a means for introducing a mixture of air and waste water at the bottom of said tanks a biological treatment means in said tank constituted by a carrier holding a fixed lipid assimilating yeast;

a discharging means for discharging the waste water from said tank treated by said biological treatment means located at the top of said tanks;

an air washing means for washing said biological treatment means located tat the bottom of said tank; and wherein said lipid-assimilating yeast is at least one selected from the group consisting of Candida schatavii N4 strain (FERM P- 12768), Candida fluviatilis N6strain (strain (FERM P-12770), Candida visuwanathii N8 strain (FERM 9-12772), Canida pseduolambica N9 strain (FERM P-12773) and Candida hellenica N10 strain (FERM P-12774).

9. An apparatus for biologically treating lipid-containing waste water according to claim 8, wherein said carrier is submerged in said waste water, and wherein said biological treatment is an aerobic treatment.

* * * * *